Patented Oct. 17, 1939

2,176,660

UNITED STATES PATENT OFFICE 2,176,660

NONCRYSTALLIZING GUM ROSIN

Samuel Palkin, Washington, D. C., and Wiley C. Smith, Arlington, Va.; dedicated to the free use of the People in the Territory of the United States No Drawing. Application July 29, 1938, Serial No. 221,968

6 Claims. (Cl. 260—107)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

We hereby dedicate the invention herein described to the free use of the People in the territory of the United States to take effect on the granting of a patent to us.

This nvention relates to a new form of pine oleoresin and rosin made therefrom, possessing certain advantages over normal pine oleoresins and rosins.

One of the objects of this invention is to provide a composition of material of the type mentioned which is non-crystallizing, the pine oleoresin being in liquid form and the rosin in a solid form.

We have found that to obtain these desired properties, it is necessary for the pine oleoresinous material to contain resenes and the sapinic type acids in proportions substantially above normal pine oleoresin with a proportionate reduction of pimaric acids, and the rosin must also be high in resenes and isomerized sapinic acid complex proportionately free from pimaric acids and substantially free from abietic acids and other crystallizable acid isomers.

The product resulting from the process hereinafter described because of its non-crystallizing feature, finds important uses in certain commercial products of manufacture, such as soaps, core oils, adhesive materials, paints, paper sizing, and so forth. When normal rosin is used in making such products, they have a tendency to granulate and thereby seriously impair the desired characteristics of the product.

In general, the process for carrying out this invention consists in allowing normal pine oleoresin to stand until the crystallizable portion has substantially settled in the form of a quasi-crystalline mass to a point where further development of crystals is negligble. (The expression "normal pine oleoresin" when used in this specification is to be understood as embracing any untreated pine oleoresin.) After the crystallizable portion has substantially settled, as above-mentioned, it is subjected to a slow gravity filtration through cloth filters. At this point it is to be understood that the use of any device, such as a filter press or any method which will subject the material to any excessive pressure, is undesirable. Such pressure tends to liquefy the crystallized mass and to defeat the object of the process. It has been found, however, that pressures between 1 to 2 atmospheres may be employed without harmful results. By means of the above filtration a partial separation is effected and the filtrate (but not the complete filtrate) is obtained, which is substantially free from crystallizable acids rich in the amorphous sapinic type acids. This gives a non-crystallizable pine oleoresinous material. To produce a non-crystallizable rosin, the end product of the above described process is subjected to steam distillation or other suitable means, by virtue of which the volatile oil is removed from the residual liquor.

A modification of the above process consists in diluting the settled pine oleoresin with about ⅛ by weight of turpentine. In this manner, the filtration step is quickened and any turpentine, if desired, may be removed after the process is completed. In the production of the non-crystallizing gum rosin, the steam distillation will result in the removal of turpentine in this modified process from the residual liquor.

In preparing adhesives with the above-mentioned non-crystallizing pine oleoresin, this material is heated with suitable quantities of viscous oil, such as spindle oil, linseed oil, and so forth, in portions to obtain the desired consistency. Adhesives produced in this manner are non-crystallizing and are especially useful in bonding labels and other materials.

In the preparation of adhesives, core oils, soaps, paper sizing, and other products, both the non-crystallizing resin and non-crystallizing rosin may be used as a substitute for the usual resins and rosins which have a tendency to crystallize. It is to be understood, however, that the uses of the products of this invention are not confined to the commercial products above enumerated, but may be used wherever pine oleoresins and rosins are generally found applicable.

In carrying out the above processes, we have found that the pine oleoresins thus refined contain sapinic type acids in portions substantially above that found in normal pine oleoresins with a proportionate reduction of pimaric acids, and having approximately 10% of resenes.

The non-crystallizing rosin is high in resenes containing approximately 14% thereof and also high in isomerized sapinic acid complex. Furthermore, this product is found to be free from pimaric acids in the same proportions that the content of isomerized sapinic acid complex is increased and also substantially free from abietic acids and other crystallizable acid isomers.

Having thus described our invention, we claim:

1. A non-crystallizing oleoresin comprising the filtrate from pine oleoresin which previously had been allowed to undergo substantially maximum crystallization.

2. A non-crystallizing resin comprising the devolatilized filtrate from pine oleoresin which previously had been allowed to undergo substantially maximum crystallization.

3. A method of making non-crystallizable oreoresin, which method comprises permitting natural pine oleoresin to undergo substantially maximum crystallization, thence filtering out the crystals, and recovering the filtrate.

4. A method of producing a non-crystallizing resin, which method comprises permitting normal pine oleoresin to undergo substantially maximum crystallization, thence filtering out the crystals, recovering the filtrate, and removing from the filtrate volatile oils.

5. A composition of matter containing as an essential active ingredient the filtrate from a pine oleoresin which previously had been allowed to undergo substantially maximum crystallization.

6. A composition of matter containing as an essential active ingredient the devolatilized filtrate from a pine oleoresin which previously had been allowed to subsantially maximum crystallization.

SAMUEL PALKIN.
WILEY C. SMITH.